US012154508B2

(12) United States Patent
Liu et al.

(10) Patent No.: US 12,154,508 B2
(45) Date of Patent: Nov. 26, 2024

(54) PIXEL CIRCUIT, DRIVING METHOD AND DISPLAY DEVICE

(71) Applicant: BEIJING BOE TECHNOLOGY DEVELOPMENT CO., LTD., Beijing (CN)

(72) Inventors: Weixing Liu, Beijing (CN); Xinxing Wang, Beijing (CN); Jintao Peng, Beijing (CN); Zhiqiang Xu, Beijing (CN); Chunfang Zhang, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/044,065

(22) PCT Filed: Jun. 24, 2022

(86) PCT No.: PCT/CN2022/101321
§ 371 (c)(1),
(2) Date: Mar. 3, 2023

(87) PCT Pub. No.: WO2023/245675
PCT Pub. Date: Dec. 28, 2023

(65) Prior Publication Data
US 2024/0282265 A1 Aug. 22, 2024

(51) Int. Cl.
*G09G 3/3258* (2016.01)

(52) U.S. Cl.
CPC ... *G09G 3/3258* (2013.01); *G09G 2300/0842* (2013.01); *G09G 2310/061* (2013.01); *G09G 2310/08* (2013.01)

(58) Field of Classification Search
CPC ......... G09G 3/3258; G09G 2300/0842; G09G 2310/061; G09G 2310/08
See application file for complete search history.

(56) References Cited

U.S. PATENT DOCUMENTS

2008/0100545 A1 5/2008 Hong
2018/0130419 A1 5/2018 He et al.
(Continued)

FOREIGN PATENT DOCUMENTS

CN 101174381 A 5/2008
CN 107342043 A 11/2017
(Continued)

*Primary Examiner* — Brent D Castiaux
(74) *Attorney, Agent, or Firm* — McCoy Russell LLP

(57) ABSTRACT

A pixel circuit includes a light emitting element, a first driving circuit, a second driving circuit, a first control circuit, a setting circuit, a first energy storage circuit, a second control circuit and a control data voltage writing-in circuit. The first control circuit controls to connect or disconnect the control end of the first driving circuit and the control end of the second driving circuit under the control of the potential of the first node. The second control circuit provides the second setting voltage to the control end of the first driving circuit, and connects or disconnects the control end of the first driving circuit and the connection node under the control of the control signal provided by the charging control end; the control data voltage writing-in circuit writes the control data voltage into the first node under the control of the first writing-in control signal.

20 Claims, 4 Drawing Sheets

(56) References Cited

U.S. PATENT DOCUMENTS

| | | | | |
|---|---|---|---|---|
| 2019/0189055 | A1* | 6/2019 | Zhang .................. | G09G 3/3291 |
| 2019/0251902 | A1* | 8/2019 | Qian .................... | G09G 3/3291 |
| 2020/0013334 | A1 | 1/2020 | Kang et al. | |
| 2020/0402463 | A1 | 12/2020 | Wang | |
| 2021/0201760 | A1 | 7/2021 | Wang et al. | |
| 2022/0044635 | A1 | 2/2022 | Roh et al. | |

FOREIGN PATENT DOCUMENTS

| | | | |
|---|---|---|---|
| CN | 108470544 | A | 8/2018 |
| CN | 109215574 | A | 1/2019 |
| CN | 109448636 | A | 3/2019 |
| CN | 109545142 | A | 3/2019 |
| CN | 109872680 | B | 11/2020 |
| CN | 112562589 | A | 3/2021 |
| JP | 2003099001 | A | 4/2003 |
| JP | 2003330413 | A | 11/2003 |
| JP | 2009069644 | A | 4/2009 |
| JP | 2009251546 | A | 10/2009 |
| KR | 20060093954 | A | 8/2006 |
| WO | 2019223341 | A1 | 11/2019 |

* cited by examiner

PIXEL CIRCUIT, DRIVING METHOD AND DISPLAY DEVICE

CROSS REFERENCE TO RELATED APPLICATION

This application is the U.S. national phase of PCT Application No. PCT/CN2022/101321 filed on Jun. 24, 2022, which is incorporated herein by reference in its entirety.

TECHNICAL FIELD

The present disclosure relates to the field of display technology, in particular to a pixel circuit, a driving method and a display device.

BACKGROUND

In recent years, with the advancement of intelligent display technology, Organic Light Emitting Diode (OLED) has become one of the hotspots in the field of display research today. With the thinning of the display panel, the border has become narrower, and the optimal design of the display panel has become more and more serious.

Related pixel circuits cannot be used for multi-grayscale display, cannot realize 256 grayscale display, and cannot increase the number of displayed grayscales without greatly increasing the cost.

SUMMARY

In one aspect, the present disclosure provides in some embodiments a pixel circuit, including: a light emitting element, a first driving circuit, a second driving circuit, a first control circuit, a setting circuit, a first energy storage circuit, a second control circuit and a control data voltage writing-in circuit; wherein the first driving circuit is configured to generate a driving current flowing from a first end of the first driving circuit to a second end of the first driving circuit under the control of a potential of a control end of the first driving circuit; the second end of the first driving circuit is electrically connected to a first end of the second driving circuit; the first control circuit is electrically connected to a first node, the control end of the first driving circuit, and a control end of the second driving circuit respectively, and is configured to control to connect or disconnect the control end of the first driving circuit and the control end of the second driving circuit under the control of a potential of the first node; the setting circuit is electrically connected to the first node, a first setting voltage end and the control end of the second driving circuit, and is configured to write a first setting voltage provided by the first setting voltage end into the control end of the second driving circuit under the control of the potential of the first node; the first node is electrically connected to a first end of the first energy storage circuit, and a second end of the first energy storage circuit is electrically connected to the first setting voltage end; the first energy storage circuit is used for storing electric energy; the second control circuit is configured to provide a second setting voltage to the control end of the first driving circuit and control to connect or disconnect the control end of the first driving circuit and a connection node under the control of a control signal provided by a charging control end; the connection node is electrically connected to the second end of the second driving circuit or the first end of the first driving circuit; the control data voltage writing-in circuit is electrically connected to a first writing-in control end, a control data voltage writing-in end and the first node respectively, and is configured to write a control data voltage provided by the control data voltage writing-in end into the first node under the control of a first writing-in control signal provided by the first writing-in control end; the second driving circuit is configured to drive the light emitting element under the control of a potential of the control end of the second driving circuit, or to control to connect or disconnect the first end of the second driving circuit and the second end of the second driving circuit.

Optionally, the second control circuit includes a first control sub-circuit and a second control sub-circuit; the charging control end includes a first control end and a second control end; the connection node is electrically connected to the second end of the second driving circuit; the first control sub-circuit is electrically connected to a first control end, a second setting voltage end and the control end of the first driving circuit respectively, and is configured to write a second setting voltage provided by the second setting voltage end into the control end of the first driving circuit under the control of a first control signal provided by the first control end; the second control sub-circuit is electrically connected to a second control end, the control end of the first driving circuit and the second end of the second driving circuit respectively, is configured to control to connect the control end of the first driving circuit and the second end of the second driving circuit under the control of a second control signal provided by the second control end.

Optionally, the second control circuit includes a first control sub-circuit and a second control sub-circuit; the charging control end includes a first control end and a second control end; the connection node is connected to the first end of the first driving circuit; the first control sub-circuit is electrically connected to a first control end, a second setting voltage end and the first end of the first driving circuit respectively, and is configured to write a second setting voltage provided by the second setting voltage end into the first end of the first driving circuit under the control of a first control signal provided by the first control end; the second control sub-circuit is electrically connected to a second control end, the control end of the first driving circuit and the first end of the first driving circuit, is configured to control to connect the control end of the first driving circuit and the first end of the first driving circuit under the control of a second control signal provided by the second control end.

Optionally, the pixel circuit further includes a data writing-in circuit, a first light emitting control circuit, a second light emitting control circuit and a second energy storage circuit; wherein the data writing-in circuit is electrically connected to a second writing-in control end, a data line, and the first end of the first driving circuit respectively, and is configured to write a data voltage provided by the data line into the first end of the first driving circuit under the control of a second writing-in control signal provided by the second writing-in control end; the first light emitting control circuit is electrically connected to a light emitting control end, a power supply voltage end and the first end of the first driving circuit respectively, and is configured to control to connect or disconnect the power supply voltage end and the first end of the first driving circuit under the control of a light emitting control signal provided by the light emitting control end; the second light emitting control circuit is electrically connected to the light emitting control end, the second end of the second driving circuit, and a first electrode of the light emitting element respectively, and is configured to control to connect the second end of the second driving circuit and the first electrode of the light emitting element under the control of the light emitting control signal; a first end of the second energy storage circuit is electrically connected to the control end of the first driving circuit, and a second end of the second energy storage circuit is electrically connected to the power supply voltage end, the second energy storage circuit is used for storing electric energy, a second electrode of the light emitting element is electrically connected to the first voltage end.

Optionally, the pixel circuit further includes a light emitting element, a data writing-in circuit, a first light emitting control circuit, a second light emitting control circuit and a second energy storage circuit; wherein a first electrode of the light emitting element is electrically connected to a power supply voltage end; the data writing-in circuit is electrically connected to a second writing-in control end, a data line, and the second end of the second driving circuit respectively, and is configured to write a data voltage provided by the data line into the second end of the second driving circuit under the control of a second writing-in control signal provided by the second writing-in control end; the first light emitting control circuit is electrically connected to a light emitting control end, a second electrode of the light emitting element and the first end of the first driving circuit respectively, and is configured to control to connect the second electrode of the light emitting element and the first end of the first driving circuit under the control of a light emitting control signal provided by the light emitting control end; the second light emitting control circuit is electrically connected to the light emitting control end, the second end of the second driving circuit, and a first voltage end respectively, and is configured to control to connect the second end of the second driving circuit and the first voltage end under the control of a light emitting control signal; a first end of the second energy storage circuit is electrically connected to the control end of the first driving circuit, and a second end of the second energy storage circuit is electrically connected to the first voltage end, the second energy storage circuit is used for storing electric energy.

Optionally, the first control circuit comprises a first transistor; a control electrode of the first transistor is electrically connected to the first node, a first electrode of the first transistor is electrically connected to the control end of the first driving circuit, and a second electrode of the first transistor is electrically connected to the control end of the second driving circuit; the setting circuit includes a second transistor; a control electrode of the second transistor is electrically connected to the first node, a first electrode of the second transistor is electrically connected to the first setting voltage end, and a second electrode of the second transistor is electrically connected to the control end of the second driving circuit; the control data voltage writing-in circuit includes a third transistor; a control electrode of the third transistor is electrically connected to the first writing-in control end, a first electrode of the third transistor is electrically connected to the control data voltage writing-in end, and a second electrode of the third transistor is electrically connected to the first node; the first energy storage circuit includes a first capacitor; the first node is electrically connected to a first end of the first capacitor, and a second end of the first capacitor is electrically connected to the first setting voltage end.

Optionally, the first control sub-circuit comprises a fourth transistor, and the second control sub-circuit comprises a fifth transistor; a control electrode of the fourth transistor is electrically connected to the first control end, a first electrode of the fourth transistor is electrically connected to the second setting voltage end, and a second electrode of the fourth transistor is electrically connected to the control end of the first driving circuit; a control electrode of the fifth transistor is electrically connected to the second control end, a first electrode of the fifth transistor is electrically connected to the control end of the first driving circuit, and a second electrode of the fifth transistor is electrically connected to the second end of the second driving circuit.

Optionally, the first control sub-circuit includes a fourth transistor, and the second control sub-circuit includes a fifth transistor; a control electrode of the fourth transistor is electrically connected to the first control end, a first electrode of the fourth transistor is electrically connected to the second setting voltage end, and a second electrode of the fourth transistor is electrically connected to the control end of the first driving circuit; a control electrode of the fifth transistor is electrically connected to the second control end, a first electrode of the fifth transistor is electrically connected to the control end of the first driving circuit, and a second electrode of the fifth transistor is electrically connected to the first end of the first driving circuit.

Optionally, the light emitting element is an organic light emitting diode, the data writing-in circuit includes a sixth transistor, the first light emitting control circuit includes a seventh transistor, the second light emitting control circuit includes an eighth transistor, and the second energy storage circuit includes a second capacitor; a control electrode of the sixth transistor is electrically connected to the second writing-in control end, a first electrode of the sixth transistor is electrically connected to the data line, and a second electrode of the sixth transistor is electrically connected to the first end of the first driving circuit; a control electrode of the seventh transistor is electrically connected to the light emitting control end, a first electrode of the seventh transistor is electrically connected to the power supply voltage end, and a second electrode of the seventh transistor is electrically connected to the first end of the first driving circuit; a control electrode of the eighth transistor is electrically connected to the light emitting control end, a first electrode of the eighth transistor is electrically connected to the second end of the second driving circuit, and a second electrode of the eighth transistor is electrically connected to an anode of the organic light emitting diode; a first end of the second capacitor is electrically connected to the control end of the first driving circuit, a second end of the second capacitor is electrically connected to the power supply voltage end, and a cathode of the organic light emitting diode is electrically connected to the first voltage end.

Optionally, the light emitting element is an organic light emitting diode, the data writing-in circuit includes a sixth transistor, the first light emitting control circuit includes a seventh transistor, the second light emitting control circuit includes an eighth transistor, and the second energy storage circuit includes a second capacitor; an anode of the organic light emitting diode is electrically connected to the power supply voltage end; a control electrode of the sixth transistor is electrically connected to the second writing-in control end, a first electrode of the sixth transistor is electrically connected to the data line, and a second electrode of the sixth transistor is electrically connected to the second end of the second driving circuit; a control electrode of the seventh transistor is electrically connected to the light emitting control end, a first electrode of the seventh transistor is electrically connected to a cathode of the organic light emitting diode, and a second electrode of the seventh transistor is electrically connected to the first end of the first driving circuit; a control electrode of the eighth transistor is electrically connected to the light emitting control end, a first electrode of the eighth transistor is electrically connected to the second end of the second driving circuit, and a second electrode of the eighth transistor is electrically connected to the first voltage end; a first end of the second capacitor is electrically connected to the control end of the first driving circuit, and a second end of the second capacitor is electrically connected to the first voltage end.

Optionally, the first driving circuit includes a first driving transistor, and the second driving circuit includes a second driving transistor; a control electrode of the first driving transistor is electrically connected to the control end of the first driving circuit, a first electrode of the first driving transistor is electrically connected to the first end of the first driving circuit, and a second electrode of the first driving transistor is electrically connected to the second end of the first driving circuit; a control electrode of the second driving transistor is electrically connected to the control end of the second driving circuit, a first electrode of the second driving transistor is electrically connected to the first end of the second driving circuit, and a second electrode of the second driving transistor is electrically connected to the second end of the second driving circuit.

In a second aspect, a driving method is applied to the pixel circuit and includes: controlling, by the first control circuit, to connect or disconnect the control end of the first driving circuit and the control end of the second driving circuit under the control of the potential of the first node; writing, by the setting circuit, the first setting voltage provided by the first setting voltage end into the control end of the second driving circuit under the control of the potential of the first node; providing, by the second control circuit, the second setting voltage to the control end of the first driving circuit under the control of the control signal provided by the charging control end, and controlling to connect or disconnect the control end of the first driving circuit and the connection node; writing, by the control data voltage writing-in circuit, the control data voltage provided by the control data voltage writing-in end into the first node under the control of the first writing-in control signal; generating, by the first driving circuit, a driving current flowing from the first end of the first driving circuit to the second end of the first driving circuit under the control of the potential of the control end of the first driving circuit; driving, by the second driving circuit, the light emitting element under the control of the potential of the control end of the second driving circuit, or, controlling to connect or disconnect the first end of the second driving circuit and the second end of the second driving circuit under the control of the potential of the control end of the second driving circuit.

Optionally, the second control circuit includes a first control sub-circuit and a second control sub-circuit; the connection node is electrically connected to the second end of the second driving circuit; the pixel circuit further includes a light emitting element, a data writing-in circuit, a first light emitting control circuit, a second light emitting control circuit, and a second energy storage circuit; a display period includes a first phase, a second phase, and a third phase set successively; the driving method includes: in the first phase, the first control sub-circuit writing the second setting voltage provided by the second setting voltage end into the control end of the first driving circuit under the control of the first control signal; the control data voltage writing-in circuit writing the control data voltage provided by the control data voltage writing-in end into the first node under the control of the first writing-in control signal provided by the first writing-in control end; in the first phase, when the control data voltage is the second voltage signal, the first control circuit controlling to connect the control end of the first driving circuit and the control end of the second driving circuit under the control of the potential of the first node; when the control data voltage is a third voltage signal, the setting circuit writing the first setting voltage provided by the first setting voltage end to the control end of the second driving circuit under the control of the potential of the first node; in the second phase, the data writing-in circuit writing the data voltage provided by the data line into the first end of the first driving circuit under the control of the second writing-in control signal; the second control sub-circuit controlling to connect the control end of the first driving circuit and the second end of the second driving circuit under the control of the second control signal; in the third phase, the first light emitting control circuit controlling to connect the power supply voltage end and the first end of the first driving circuit under the control of the light emitting control signal; the second light emitting control circuit controlling to connect the second end of the second driving circuit and the first electrode of the light emitting element under the control of the light emitting control signal; in the first phase, when the first control circuit controls to connect the control end of the first driving circuit and the control end of the second driving circuit under the control of the potential of the first node, and in the third phase, the first driving circuit and the second driving circuit driving the light emitting element to emit light; in the first phase, when the setting circuit writes the first setting voltage provided by the first setting voltage end into the control end of the second driving circuit under the control of the potential of the first node, in the third phase, the first driving circuit driving the light emitting element to emit light, and the second driving circuit controlling to connect the first end of the second driving circuit and the second end of the second driving circuit.

Optionally, the second control circuit includes a first control sub-circuit and a second control sub-circuit; the connection node is electrically connected to the first end of the first driving circuit; the pixel circuit further includes a light emitting element, a data writing-in circuit, a first light emitting control circuit, a second light emitting control circuit, and a second energy storage circuit; a display period includes a first phase, a second phase, and a third phase set successively; the driving method includes: in the first phase, the first control sub-circuit writing the second setting voltage provided by the second setting voltage end into the first end of the first driving circuit under the control of the first control signal; the second control sub-circuit controlling to connect the control end of the first driving circuit and the first end of the first driving circuit under the control of the second control signal; the control data voltage writing-in circuit writing the control data voltage provided by the control data voltage writing-in end into the first node under the control of the first writing-in control signal provided by the first writing-in control end; in the first phase, when the control data voltage is a fourth voltage signal, the first control circuit controlling to connect the control end of the first driving circuit and the control end of the second driving circuit under the control of the potential of the first node; when the control data voltage is a fifth voltage signal, the setting circuit writing the first setting voltage provided by the first setting voltage end into the control end of the second driving circuit under the control of the potential of the first node; in the second light emitting phase, the data writing-in circuit writing the data voltage provided by the data line into the second end of the second driving circuit under the control of the second writing-in control signal; the second control sub-circuit controlling to connect the control end of the first driving circuit and the first end of the first driving circuit under the control of the second control signal; in the third phase, the first light emitting control circuit controlling to connect the second electrode of the light emitting element and the first end of the first driving circuit under the control of the light emitting control signal; the second light emitting control circuit controlling to connect the second end of the second driving circuit and the first voltage end under the control of the light emitting control signal; in the first phase, when the first control circuit controls to connect the control end of the first driving circuit and the control end of the second driving circuit under the control of the potential of the first node, in the third phase, the first driving circuit and the second driving circuit driving the light emitting element to emit light; in the first phase, when the setting circuit writes the first setting voltage provided by the first setting voltage end into the control end of the second driving circuit under the control of the potential of the first node, in the third phase, the first driving circuit driving the light emitting element to emit light, and the second driving circuit controlling to connect the first end of the second driving circuit and the second end of the second driving circuit.

In a third aspect, a display device includes the pixel circuit.

DETAILED DESCRIPTION

Figure 1:
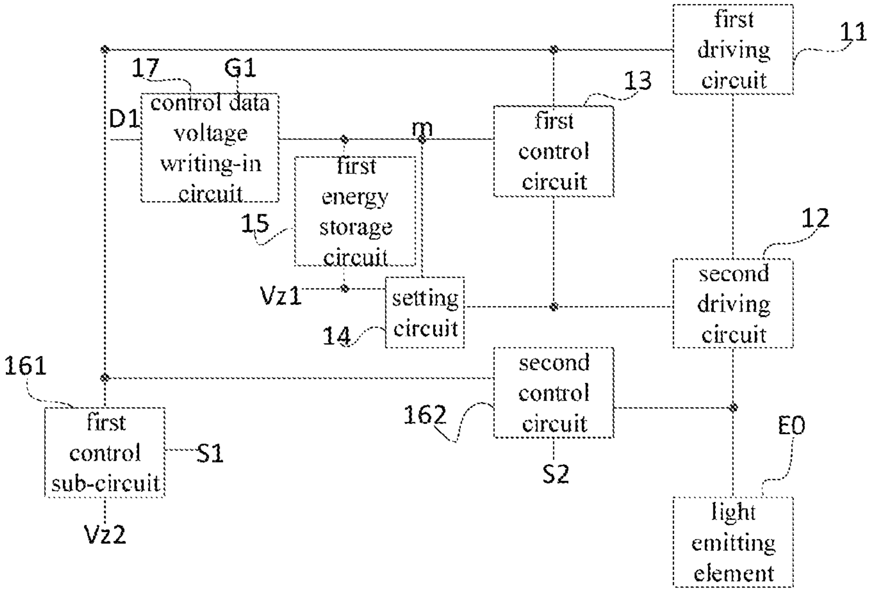
FIG. 1 is a structural diagram of a pixel circuit according to at least one embodiment of the present disclosure.

The following will clearly and completely describe the technical solutions in the embodiments of the present disclosure with reference to the accompanying drawings. Apparently, the described embodiments are only some of the embodiments of the present disclosure, not all of them. Based on the embodiments in the present disclosure, all other embodiments obtained by a person skilled in the art without creative work belong to the protection scope of the present disclosure.

The transistors used in all the embodiments of the present disclosure may be triodes, thin film transistors or field effect transistors or other devices with the same characteristics. In the embodiments of the present disclosure, in order to distinguish the two electrodes of the transistor other than the gate electrode, one of the electrodes is referred to as a first electrode, and the other electrode is referred to as a second electrode.

In actual operation, when the transistor is a triode, the control electrode can be a base, the first electrode can be a collector, and the second electrode can be an emitter; or, the control electrode can be a base, the first electrode may be an emitter, and the second electrode may be a collector.

In actual operation, when the transistor is a thin film transistor or a field effect transistor, the control electrode may be a gate electrode, the first electrode may be a drain electrode, and the second electrode may be a source electrode; or, the control electrode may be a gate electrode, the first electrode may be a source electrode, and the second electrode may be a drain electrode.

The pixel circuit described in the embodiment of the present disclosure includes a light emitting element, a first driving circuit, a second driving circuit, a first control circuit, a setting circuit, a first energy storage circuit, a second control circuit and a control data voltage writing-in circuit;

The first driving circuit is used to generate a driving current flowing from a first end of the first driving circuit to a second end of the first driving circuit under the control of a potential of an control end of the first driving circuit;

The second end of the first driving circuit is electrically connected to a first end of the second driving circuit 12;

The first control circuit is electrically connected to a first node m, the control end of the first driving circuit, and a control end of the second driving circuit, is configured to control to connect or disconnect the control end of the first driving circuit and the control end of the second driving circuit under the control of a potential of the first node m;

The setting circuit is electrically connected to the first node, a first setting voltage end and the control end of the second driving circuit, and is used to write a first setting voltage provided by the first setting voltage end into the control end of the second driving circuit under the control of the potential of the first node; the first node is electrically connected to a first end of the first energy storage circuit, and a second end of the first energy storage circuit is electrically connected to the first setting voltage end; the first energy storage circuit is used to store electric energy;

The second control circuit is used to provide a second setting voltage to the control end of the first driving circuit under the control of a control signal provided by a charging control end, and control to connect or disconnect the control end of the first driving circuit and a connection node; the connection node is electrically connected to the second end of the second driving circuit, or the connection node is electrically connected to the first end of the first driving circuit;

The control data voltage writing-in circuit is respectively electrically connected to a first writing-in control end, a control data voltage writing-in end and the first node, and is configured to write the control data voltage provided by the control data voltage writing-in end into the first node under the control of the first writing-in control signal provided by the first writing-in control end;

The second driving circuit is used to drive the light emitting element under the control of the potential of the control end of the second driving circuit, or control to connect or disconnect the first end of the second driving circuit and the second end of the second driving circuit.

When the pixel circuit described in the embodiments of the present disclosure is in operation, the first driving circuit and the second driving circuit are used to drive the light emitting element to emit light when displaying low gray-scale, and the first driving circuit is used to drive the light emitting element to emit light when displaying high grayscale, and the second driving transistor included in the second driving circuit is fully turned on;

The sub-threshold swing (SS swing) of the first driving transistor included in the first driving circuit is consistent with the SS swing of the second driving transistor included in the second driving circuit, and they can share a data voltage value range.

In at least one embodiment of the present disclosure, the aspect ratio of the first driving transistor is different from that of the second driving transistor, and the aspect ratio of the second driving transistor is larger than that of the first driving transistor, for example, the aspect ratio of the second driving transistor may be twice that of the first driving transistor, but not limited thereto.

The pixel circuit described in the embodiments of the present disclosure can be used for multi-grayscale display, realize 256-grayscale display which is beyond normal display, and can increase the number of displayed grayscales without greatly increasing the cost.

In at least one embodiment of the present disclosure, the second control circuit includes a first control sub-circuit and a second control sub-circuit; the charging control end includes a first control end and a second control end; the connection node is electrically connected to the second end of the second driving circuit;

The first control sub-circuit is electrically connected to the first control end, the second setting voltage end and the control end of the first driving circuit, and is used to write the second setting voltage provided by the second setting voltage end into the control end of the first driving circuit under the control of the first control signal provided by the first control end, so as to set the potential of the control end of the first driving circuit;

The second control sub-circuit is electrically connected to the second control end, the control end of the first driving circuit and the second end of the second driving circuit respectively, is configured to control to connect the control end of the first driving circuit and the second end of the second driving circuit under the control of the second control end provided by the second control end.

As shown in FIG. 1, the pixel circuit described in at least one embodiment of the present disclosure includes a light emitting element E0, a first driving circuit 11, a second driving circuit 12, a first control circuit 13, a setting circuit 14, a first energy storage circuit 15, a second control circuit and a control data voltage writing-in circuit 17;

The second control circuit includes a first control sub-circuit 161 and a second control sub-circuit 162; the charging control end includes a first control end S1 and a second control end S2; the connection node is connected to the second end of the second driving circuit 12;

The first driving circuit 11 is used to generate a driving current flowing from the first end of the first driving circuit 11 to the second end of the first driving circuit 11 under the control of the potential of the control end of the first driving circuit;

The second end of the first driving circuit 11 is electrically connected to the first end of the second driving circuit 12;

The first control circuit 13 is electrically connected to the first node m, the control end of the first driving circuit 11, and the control end of the second driving circuit 12 respectively, and is used to control to connect or disconnect the control end of the first driving circuit 11 and the control end of the second driving circuit 12 under the control of the potential of the first node m;

The setting circuit 14 is electrically connected to the first node m, the first setting voltage end Vz1 and the control end of the second driving circuit 12, and is used to write the first setting voltage provided by the first setting voltage end Vz1 into the control end of the second driving circuit 12 under the control of the potential of the first node m;

The first node m is electrically connected to the first end of the first energy storage circuit 15, and the second end of the first energy storage circuit 15 is electrically connected to the first setting voltage end Vz1; the first energy storage circuit 15 is used for storing electric energy;

The first control sub-circuit 161 is electrically connected to the first control end S1, the second setting voltage end Vz2 and the control end of the first driving circuit 11, respectively, and is used to write the second setting voltage provided by the second setting voltage end Vz2 into the control end of the first driving circuit 11 under the control of the first control signal provided by the first control end S1, so as to set the potential of the control end of the first driving circuit 11;

The second control sub-circuit 162 is electrically connected to the second control end S2, the control end of the first driving circuit 11 and the second end of the second driving circuit 12, is configured to control to connect the control end of the first driving circuit 11 and the second end of the second driving circuit 12 under the control of the second control signal provided by the second control end S2;

The control data voltage writing-in circuit 17 is electrically connected to the first writing-in control end G1, the control data voltage writing-in end D1 and the first node m respectively, and is used to write the control data voltage Vdata1 provided by the control data voltage writing-in end D1 into the first node m under the control of the first writing-in control signal provided by the first writing-in control end G1, so as to set the potential of the first node m;

The second end of the second driving circuit 12 is electrically connected to the light emitting element E0, and is used to drive the light emitting element E0 to emit light under the control of the potential of the control end of the second driving circuit 12, or to control to connect or disconnect the first end of the second driving circuit 12 and the second end of the second driving circuit 12.

In at least one embodiment of the present disclosure, the first writing-in control end may be the same control end as the first control end, the second setting voltage end may be a first low voltage end, and the first setting voltage end may be the second low voltage end, but not limited thereto.

Figure 2:
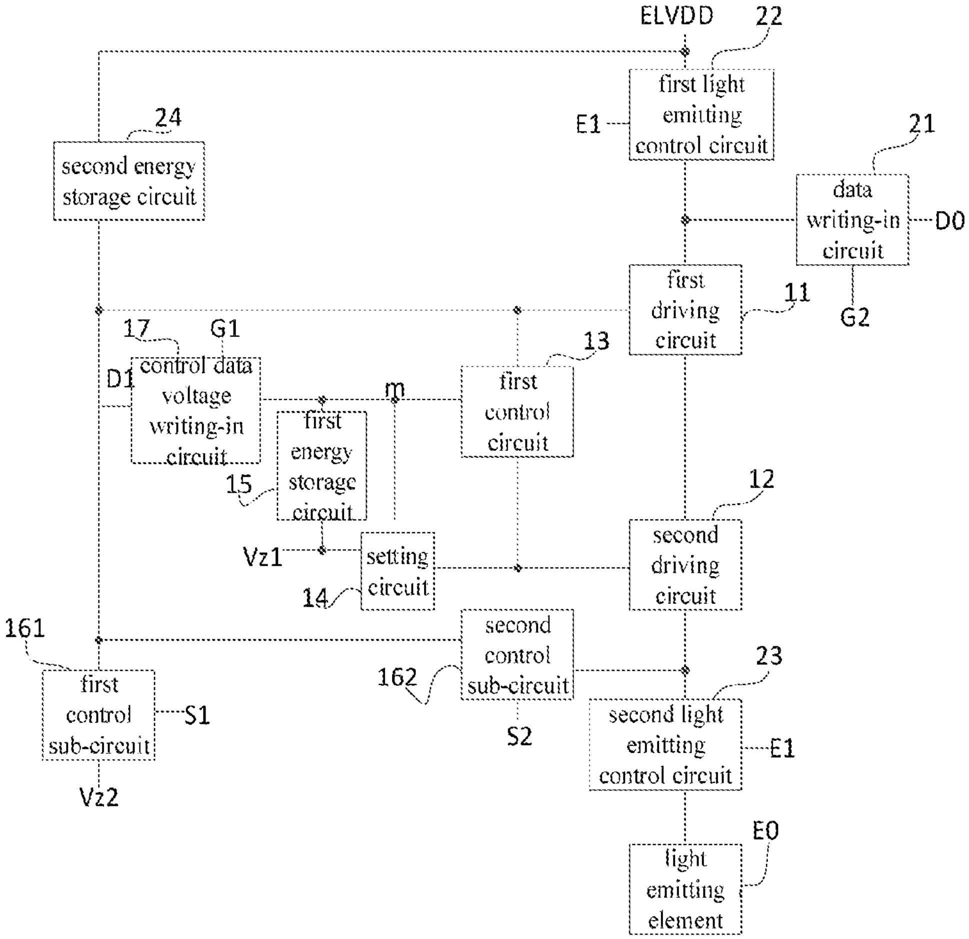
FIG. 2 is a structural diagram of a pixel circuit according to at least one embodiment of the present disclosure.

As shown in FIG. 2, on the basis of at least one embodiment of the pixel circuit shown in FIG. 1, the pixel circuit further includes a data writing-in circuit 21, a first light emitting control circuit 22, a second light emitting control circuit 23 and a second energy storage circuit 24;

The data writing-in circuit 21 is electrically connected to the second writing-in control end G2, the data line D0, and the first end of the first driving circuit 11, respectively, is configured to write the data voltage Vdata0 provided by the data line D0 into the first end of the first driving circuit 11 under the control of the second writing-in control signal provided by the second writing-in control end G2;

The first light emitting control circuit 22 is electrically connected to the light emitting control end E1, the power supply voltage end ELVDD and the first end of the first driving circuit 11 respectively, and is used to control to connect or disconnect the power supply voltage end ELVDD and the first end of the first driving circuit 11 under the control of the light emitting control signal provided by the light emitting control end E1;

The second light emitting control circuit 23 is electrically connected to the light emitting control end E1, the second end of the second driving circuit 12 and the first electrode of the light emitting element E0 respectively, and is used to control to connect the second end of the second driving circuit 12 and the first electrode of the light emitting element E0 under the control of the light emitting control signal;

The first end of the second energy storage circuit 24 is electrically connected to the control end of the first driving circuit 11, the second end of the second energy storage circuit 24 is electrically connected to the power supply voltage end ELVDD, and the second energy storage circuit 24 is used to store electric energy; the second electrode of the light emitting element E0 is electrically connected to the first voltage end V1.

In at least one embodiment of the present disclosure, the first voltage end may be a first low voltage end, but not limited thereto.

In at least one embodiment of the present disclosure, the second writing-in control end G2 may be the second control end S2, but not limited thereto.

When the pixel circuit shown in FIG. 2 of the present disclosure is in operation, the display period includes a first phase, a second phase, and a third phase set successively;

In the first phase, the first control sub-circuit 161 writes the second setting voltage provided by the second setting voltage end Vz1 into the control end of the first driving circuit 11 under the control of the first control signal; the control data voltage writing-in circuit 17 writes the control data voltage Vdata1 provided by the control data voltage writing-in end D1 into the first node m under the control of the first writing-in control signal provided by the first writing-in control end G1;

In the first phase, when the control data voltage Vdata1 is the second voltage signal, the first control circuit 13 controls to connect the control end of the first driving circuit 11 and the control ends of the second driving circuit 12 under the control of the potential of the first node m; when the control data voltage Vdata1 is a third voltage signal, the setting circuit 14 writes the first setting voltage provided by the first setting voltage end Vz1 into the control end of the second driving circuit 12 under the control of the potential of the first node m;

In the second phase, the data writing-in circuit 21 writes the data voltage Vdata0 provided by the data line D0 into the first end of the first driving circuit 11 under the control of the second writing-in control signal; the second control sub-circuit 162 controls to connect the control end of the first driving circuit 11 and the second end of the second driving circuit 12 under the control of the second control signal;

In the third phase, the first light emitting control circuit 22 controls to connect the power supply voltage end ELVDD and the first end of the first driving circuit 11 under the control of the light emitting control signal; the second light emitting control circuit controls to connect the second end of the second driving circuit 12 and the first electrode of the light emitting element E0 under the control of the light emitting control signal;

in the first phase, when the first control circuit 13 controls to connect the control end of the first driving circuit 11 and the control end of the second driving circuit 12 under the control of the potential of the first node m, in the third phase, the first driving circuit 11 and the second driving circuit 12 drive the light emitting element E0 to emit light;

in the first phase, when the setting circuit 14 writes the first setting voltage provided by the first setting voltage end Vz1 into the control end of the second driving circuit under the control of the potential of the first node m 12, in the third phase, the first driving circuit 11 drives the light emitting element E0 to emit light, and the second driving circuit 12 controls to connect the first end of the second driving circuit 12 and the second end of the second driving circuit 12.

In at least one embodiment of the present disclosure, the second voltage signal may be a high voltage signal, and the third voltage signal may be a low voltage signal, but not limited thereto.

In at least one embodiment of the present disclosure, the second control circuit includes a first control sub-circuit and a second control sub-circuit; the charging control end includes a first control end and a second control end; the connection node is connected to the first end of the first driving circuit;

The first control sub-circuit is electrically connected to the first control end, the second setting voltage end and the first end of the first driving circuit respectively, and is used to write a second setting voltage provided by the second setting voltage end into the first end of the first driving circuit under the control of the first control signal provided by the first control end, to set the potential of the first end of the first driving circuit;

The second control sub-circuit is electrically connected to the second control end, the control end of the first driving circuit and the first end of the first driving circuit respectively, is configured to control to connect the control end of the first driving circuit and the first end of the first driving circuit under the control of the second control signal provided by the second control end.

Figure 3:
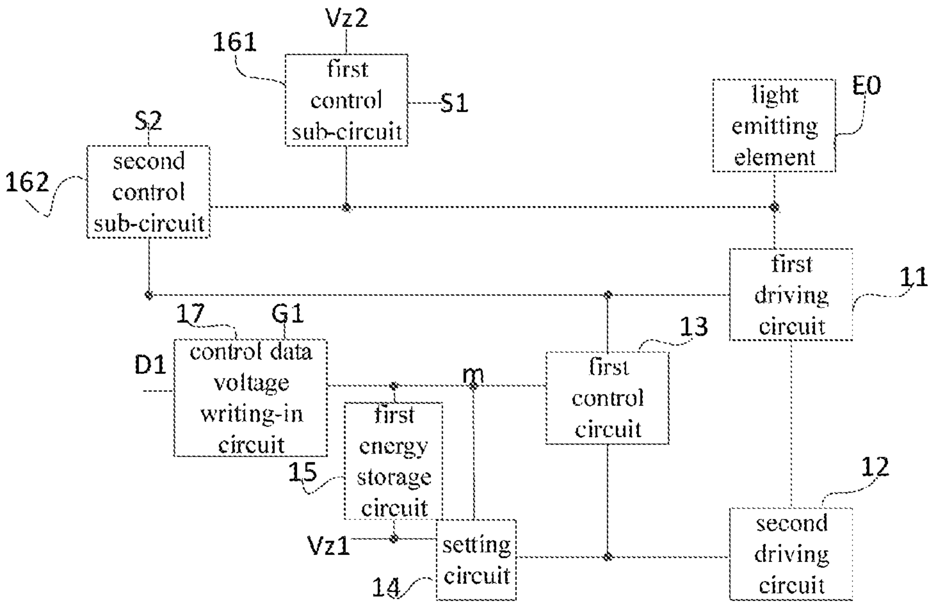
FIG. 3 is a structural diagram of a pixel circuit according to at least one embodiment of the present disclosure.

As shown in FIG. 3, the pixel circuit described in at least one embodiment of the present disclosure includes a light emitting element E0, a first driving circuit 11, a second driving circuit 12, a first control circuit 13, a setting circuit 14, a first energy storage circuit 15, a second control circuit and the control data voltage writing-in circuit 17;

The second control circuit includes a first control sub-circuit 161 and a second control sub-circuit 162; the charging control end includes a first control end S1 and a second control end S2; the connection node is connected to the first end of the first driving circuit 11;

The first driving circuit 11 is used to generate a driving current flowing from the first end of the first driving circuit 11 to the second end of the first driving circuit 11 under the control of the potential of the control end of the first driving circuit; the first end of the first driving circuit 11 is electrically connected to the light emitting element E0;

The second end of the first driving circuit 11 is electrically connected to the first end of the second driving circuit 12;

The first control circuit 13 is electrically connected to the first node m, the control end of the first driving circuit 11, and the control end of the second driving circuit 12 respectively, and is used to control to connect or disconnect the control end of the first driving circuit 11 and the control end of the second driving circuit 12 under the control of the potential of the first node m;

The setting circuit 14 is electrically connected to the first node m, the first setting voltage end Vz1 and the control end of the second driving circuit 12, and is used to write the first setting voltage provided by the first setting voltage end Vz1 into the control end of the second driving circuit 12 under the control of the potential of the first node m; the first node m is electrically connected to the first end of the first energy storage circuit 15, the second end of the first energy storage circuit 15 is electrically connected to the first setting voltage end Vz1; the first energy storage circuit 15 is used to store electric energy;

The first control sub-circuit 161 is electrically connected to the first control end S1, the second setting voltage end Vz2 and the first end of the first driving circuit 11 respectively, and is used to write the second setting voltage provided by the second setting voltage end Vz2 into the first end of the first driving circuit 11 under the control of the first control signal provided by the first control end S1, so as to set the potential of the first end of the first driving circuit 11.

The second control sub-circuit 162 is electrically connected to the second control end S2, the control end of the first driving circuit 11 and the first end of the first driving circuit 11, is configured to control to connect the control end of the first driving circuit 11 and the first end of the first driving circuit 11 under the control of the second control signal provided by the second control end S2;

The control data voltage writing-in circuit 17 is electrically connected to the first writing-in control end G1, the control data voltage writing-in end D1 and the first node m respectively, and is used to write the control data voltage Vdata1 provided by the control data voltage writing-in end D1 into the first node m under the control of the first writing-in control signal provided by the first writing-in control end D1, so as to set the potential of the first node m;

The second driving circuit 12 is used to drive the light emitting element under the control of the potential of the control end of the second driving circuit, or control to connect or disconnect the first end of the second driving circuit 12 and the second end of the second driving circuit 12.

In at least one embodiment of the present disclosure, the first writing-in control end may be the same control end as the first control end, the second setting voltage end may be a power supply voltage end, and the first setting voltage end may be a high voltage end, but not limited thereto.

Figure 4:
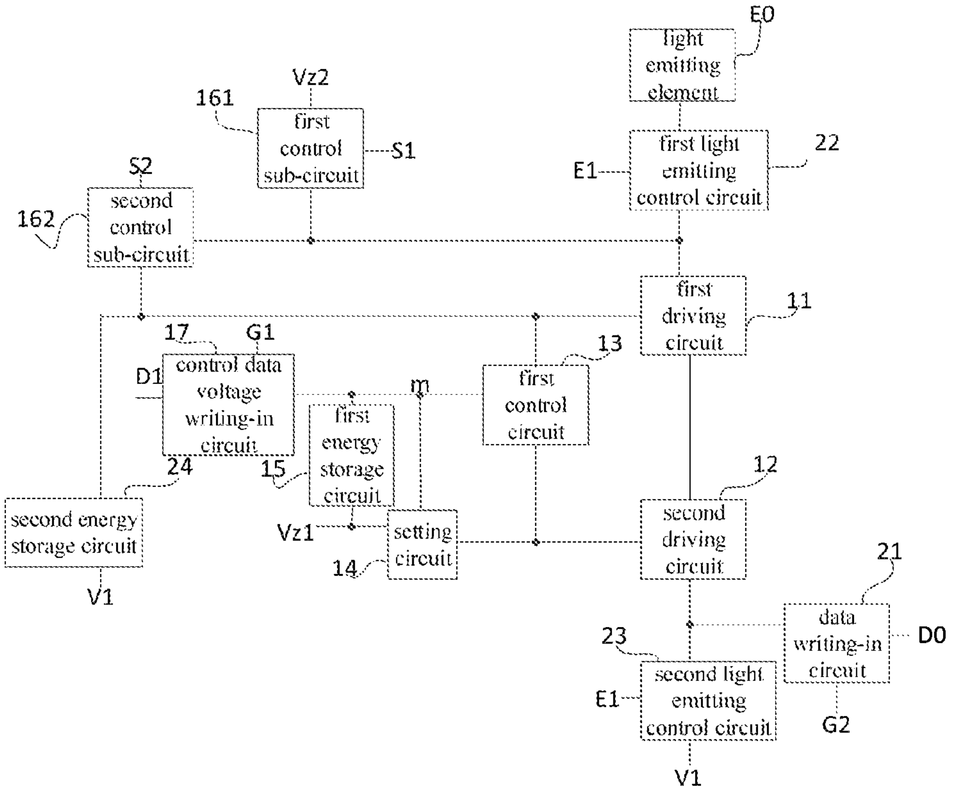
FIG. 4 is a structural diagram of a pixel circuit according to at least one embodiment of the present disclosure.

As shown in FIG. 4, on the basis of at least one embodiment of the pixel circuit shown in FIG. 3, the pixel circuit further includes the data writing-in circuit 21, a first light emitting control circuit 22, a second light emitting control circuit 23 and a second energy storage circuit 24; the first electrode of the light emitting element E0 is electrically connected to the power supply voltage end ELVDD;

The data writing-in circuit 21 is electrically connected to the second writing-in control end G2, the data line D0, and the second end of the second driving circuit 12 respectively, and is used to used write the data voltage Vdata0 provided by the data line D0 into the second end of the second driving circuit 12 under the control of the second writing-in control signal provided by the second writing-in control end G2.

The first light emitting control circuit 22 is electrically connected to the light emitting control end E1, the second electrode of the light emitting element E0 and the first end of the first driving circuit 11 respectively, and is used to control to connect the second electrode of the light emitting element E0 and the first end of the first driving circuit 11 under the control of the light emitting control signal provided by the light emitting control end E1;

The second light emitting control circuit 23 is electrically connected to the light emitting control end E1, the second end of the second driving circuit 12, and the first voltage end V1 respectively, and is used to control to connect the second end of the second driving circuit 12 and the first voltage end V1 under the control of the light emitting control signal;

The first end of the second energy storage circuit 24 is electrically connected to the control end of the first driving circuit 11, and the second end of the second energy storage circuit 24 is electrically connected to the first voltage end V1, the second energy storage circuit 24 is used for storing electric energy.

In at least one embodiment of the present disclosure, the first voltage end may be a first low voltage end, but not limited thereto.

In at least one embodiment of the present disclosure, the second writing-in control end G2 may be the second control end S2, but not limited thereto.

When the pixel circuit shown in FIG. 4 of the present disclosure is in operation, the display period includes a first phase, a second phase, and a third phase set successively; the driving method includes:

In the first phase, the first control sub-circuit 161 writes the second setting voltage provided by the second setting voltage end Vz2 into the first end of the first driving circuit 11 under the control of the first control signal; the second control sub-circuit 162 controls to connect the control end of the first driving circuit 11 and the first end of the first driving circuit 11 under the control of the second control signal; the control data voltage writing-in circuit 17 writes the control data voltage Vdata1 provided by the control data voltage writing-in end D1 into the first node m under the control of the first writing-in control signal provided by the first writing-in control end G1;

In the first phase, when the control data voltage Vdata1 is the fourth voltage signal, the first control circuit 13 controls to connect the control end of the first driving circuit 11 and the control end of the second driving circuit 12 under the control of the potential of the first node m; when the control data voltage Vdata1 is the fifth voltage signal, the setting circuit 14 writes the first setting voltage provided by the first setting voltage end Vz1 into the control end of the second driving circuit 12 under the control of the potential of the first node m;

In the second light emitting phase, the data writing-in circuit 21 writes the data voltage Vdata0 provided by the data line D0 into the second end of the second driving circuit 12 under the control of the second writing-in control signal; the second control sub-circuit 162 controls to connect the control end of the first driving circuit 11 and the first end of the first driving circuit 11 under the control of the second control signal;

In the third phase, the first light emitting control circuit 22 controls to connect the second electrode of the light emitting element E0 and the first end of the first driving circuit 11 under the control of the light emitting control signal; the second lighting control circuit 23 controls to connect the second end of the second driving circuit 12 and the first voltage end V1 under the control of the light emitting control signal;

in the first phase, when the first control circuit 13 controls to connect the control end of the first driving circuit 11 and the control end of the second driving circuit 12 under the control of the potential of the first node m, in the third phase, the first driving circuit 11 and the second driving circuit 12 drive the light emitting element to emit light;

in the first phase, when the setting circuit 14 writes the first setting voltage provided by the first setting voltage end Vz1 into the control end of the second driving circuit 12 under the control of the potential of the first node m, in the third phase, the first driving circuit 11 drives the light emitting element E0 to emit light, and the second driving circuit 12 controls to connect the first end of the second driving circuit 12 and the second end of the second driving circuit 12.

In at least one embodiment of the present disclosure, the fourth voltage signal may be a high voltage signal, and the fifth voltage signal may be a low voltage end, but not limited thereto.

Optionally, the first control circuit includes a first transistor;

A control electrode of the first transistor is electrically connected to the first node, a first electrode of the first transistor is electrically connected to the control end of the first driving circuit, and a second electrode of the first transistor is electrically connected to the control end of the second driving circuit;

The setting circuit includes a second transistor;

A control electrode of the second transistor is electrically connected to the first node, a first electrode of the second transistor is electrically connected to the first setting voltage end, and a second electrode of the second transistor is electrically connected to the control end of the second driving circuit;

The control data voltage writing-in circuit includes a third transistor;

A control electrode of the third transistor is electrically connected to the first writing-in control end, a first electrode of the third transistor is electrically connected to the control data voltage writing-in end, and a second electrode of the third transistor electrically connected to the first node;

The first energy storage circuit includes a first capacitor;

The first node is electrically connected to a first end of the first capacitor, and a second end of the first capacitor is electrically connected to the first setting voltage end.

Optionally, the first control sub-circuit includes a fourth transistor, and the second control sub-circuit includes a fifth transistor;

A control electrode of the fourth transistor is electrically connected to the first control end, a first electrode of the fourth transistor is electrically connected to the second setting voltage end, and a second electrode of the fourth transistor is electrically connected to the control end of the first driving circuit;

A control electrode of the fifth transistor is electrically connected to the second control end, a first electrode of the fifth transistor is electrically connected to the control end of the first driving circuit, and a second electrode of the fifth transistor is electrically connected to the second end of the second driving circuit.

Optionally, the first control sub-circuit includes a fourth transistor, and the second control sub-circuit includes a fifth transistor;

A control electrode of the fourth transistor is electrically connected to the first control end, a first electrode of the fourth transistor is electrically connected to the second setting voltage end, and a second electrode of the fourth transistor is electrically connected to the control end of the first driving circuit;

A control electrode of the fifth transistor is electrically connected to the second control end, a first electrode of the fifth transistor is electrically connected to the control end of the first driving circuit, and a second electrode of the fifth transistor is electrically connected to the first end of the first driving circuit.

Optionally, the light emitting element is an organic light emitting diode, the data writing-in circuit includes a sixth transistor, the first light emitting control circuit includes a seventh transistor, the second light emitting control circuit includes an eighth transistor, and the second energy storage circuit includes a second capacitor;

A control electrode of the sixth transistor is electrically connected to the second writing-in control end, a first electrode of the sixth transistor is electrically connected to the data line, and a second electrode of the sixth transistor is electrically connected to the first end of the first driving circuit;

A control electrode of the seventh transistor is electrically connected to the light emitting control end, a first electrode of the seventh transistor is electrically connected to the power supply voltage end, and a second electrode of the seventh transistor is electrically connected to the first end of the first driving circuit;

A control electrode of the eighth transistor is electrically connected to the light emitting control end, a first electrode of the eighth transistor is electrically connected to the second end of the second driving circuit, and a second electrode of the eighth transistor is electrically connected to the anode of the organic light emitting diode;

A first end of the second capacitor is electrically connected to the control end of the first driving circuit, a second end of the second capacitor is electrically connected to the power supply voltage end, and the second energy storage circuit is used for storing electrical energy; the cathode of the organic light emitting diode is electrically connected to the first voltage end.

Optionally, the light emitting element is an organic light emitting diode, the data writing-in circuit includes a sixth transistor, the first light emitting control circuit includes a seventh transistor, the second light emitting control circuit includes an eighth transistor, and the second energy storage circuit includes a second capacitor; the anode of the organic light emitting diode is electrically connected to the power supply voltage end;

A control electrode of the sixth transistor is electrically connected to the second writing-in control end, a first electrode of the sixth transistor is electrically connected to the data line, and a second electrode of the sixth transistor is electrically connected to the second end of the second driving circuit;

A control electrode of the seventh transistor is electrically connected to the light emitting control end, a first electrode of the seventh transistor is electrically connected to the cathode of the organic light emitting diode, and a second electrode of the seventh transistor is electrically connected to the first end of the first driving circuit;

A control electrode of the eighth transistor is electrically connected to the light emitting control end, a first electrode of the eighth transistor is electrically connected to the second end of the second driving circuit, and a second electrode of the eighth transistor is electrically connected to the first voltage end;

The first end of the second capacitor is electrically connected to the control end of the first driving circuit, and the second end of the second capacitor is electrically connected to the first voltage end.

Optionally, the first driving circuit includes a first driving transistor, and the second driving circuit includes a second driving transistor;

A control electrode of the first driving transistor is electrically connected to the control end of the first driving circuit, a first electrode of the first driving transistor is electrically connected to the first end of the first driving circuit, and a second electrode of the first driving transistor is electrically connected to the second end of the first driving circuit;

A control electrode of the second driving transistor is electrically connected to the control end of the second driving circuit, a first electrode of the second driving transistor is electrically connected to the first end of the second driving circuit, and the second electrode of the second driving transistor is electrically connected to the second end of the second driving circuit.

Figure 5:
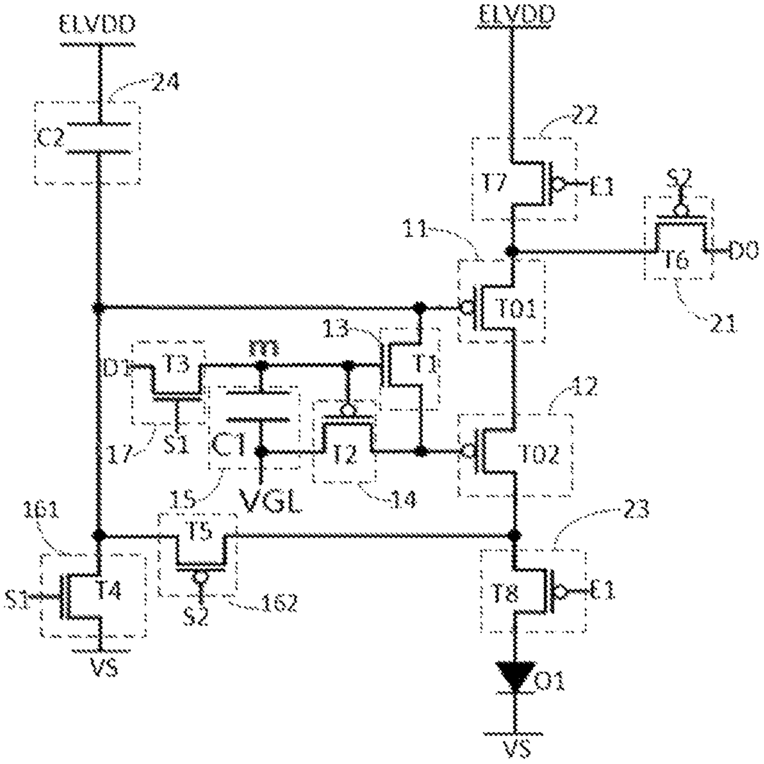
FIG. 5 is a circuit diagram of a pixel circuit according to at least one embodiment of the present disclosure.

As shown in FIG. 5, on the basis of the pixel circuit shown in FIG. 2, the first control circuit 13 includes a first transistor T1; the first driving circuit 11 includes a first driving transistor T01, the second driving circuit 12 includes a second driving transistor T02;

The gate electrode of the first transistor T1 is electrically connected to the first node m, the source electrode of the first transistor T1 is electrically connected to the gate electrode of the first driving transistor T01, and the drain electrode of the first transistor T1 is electrically connected to the gate electrode of the second driving transistor T02;

The setting circuit 14 includes a second transistor T2;

The gate electrode of the second transistor T2 is electrically connected to the first node m, the source electrode of the second transistor T2 is electrically connected to the second low voltage end VGL, and the drain electrode of the second transistor T2 is electrically connected to the gate electrode of the second driving transistor T02; the second low voltage end VGL is used to provide a second low voltage;

The control data voltage writing-in circuit 17 includes a third transistor T3;

The gate electrode of the third transistor T3 is electrically connected to the first control end S1, the source electrode of the third transistor T3 is electrically connected to the control data voltage writing-in end D1, and the drain electrode of the third transistor T3 is electrically connected to the first node m;

The first energy storage circuit 15 includes a first capacitor C1;

The first node m is electrically connected to the first end of the first capacitor C1, and the second end of the first capacitor C1 is electrically connected to the second low voltage end VGL;

The first control sub-circuit 161 includes a fourth transistor T4, and the second control sub-circuit 162 includes a fifth transistor T5;

The gate electrode of the fourth transistor T4 is electrically connected to the first control end S1, the source electrode of the fourth transistor T4 is electrically connected to the first low voltage end VS, and the drain electrode of the fourth transistor T4 is electrically connected to the gate electrode of the first driving transistor T01; the first low voltage end is used to provide a first low voltage Vss;

The gate electrode of the fifth transistor T5 is electrically connected to the second control end S2, the source electrode of the fifth transistor T5 is electrically connected to the gate electrode of the first driving transistor T01, and the drain electrode of the fifth transistor T5 is electrically connected to the drain electrode of the second driving transistor T02;

The light emitting element is an organic light emitting diode O1, the data writing-in circuit 21 includes a sixth transistor T6, the first light emitting control circuit 22 includes a seventh transistor T7, and the second light emitting control circuit 23 includes an eighth transistor T8, the second energy storage circuit 24 includes a second capacitor C2;

The gate electrode of the sixth transistor T6 is electrically connected to the second control end S2, the source electrode of the sixth transistor T6 is electrically connected to the data line D0, and the drain electrode of the sixth transistor T6 is electrically connected to the source electrode of the first driving transistor T01;

The gate electrode of the seventh transistor T7 is electrically connected to the light emitting control end E1, the source electrode of the seventh transistor T7 is electrically connected to the power supply voltage end ELVDD, and the drain electrode of the seventh transistor T7 is electrically connected to the source electrode of the first driving transistor T01;

The gate electrode of the eighth transistor T8 is electrically connected to the light emitting control end E1, the source electrode of the eighth transistor T8 is electrically connected to the drain electrode of the second driving transistor T02, and the drain electrode of the eighth transistor T8 is electrically connected to the anode of the organic light emitting diode O1;

The first end of the second capacitor C2 is electrically connected to the gate electrode of the first driving transistor T01, the second end of the second capacitor C2 is electrically connected to the power supply voltage end ELVDD, and the cathode of the organic light emitting diode O1 is electrically connected to the first low voltage end VS; the power supply voltage end ELVDD is used to provide a power supply voltage Vdd.

In at least one embodiment of the pixel circuit shown in FIGS. 5, T1, T3 and T4 are all n-type transistors, and T2, T5, T6, T7, T8, T01 and T02 are p-type transistors, but not limited thereto.

In at least one embodiment of the present disclosure, the threshold voltage of T01 and the threshold voltage of T02 are equal, and the threshold voltage of T01 and the threshold voltage of T02 are Vth.

In at least one embodiment of the pixel circuit shown in FIG. 5, the first writing-in control end and the first control end are the same control end, and the second writing-in control end and the second control end are the same control end; the second setting voltage end is the first low voltage end VS, and the first setting voltage end is the second low voltage end VGL, but not limited thereto.

Figure 6:
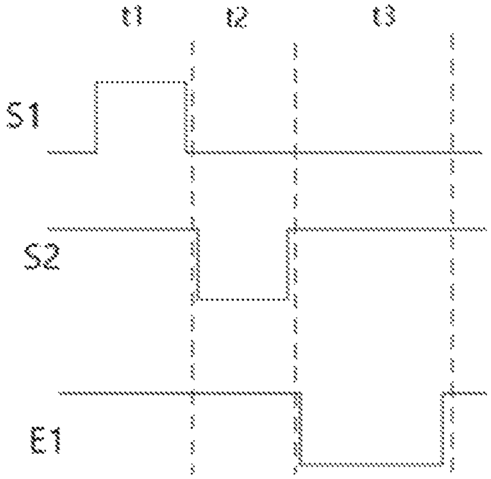
FIG. 6 is a working timing diagram of the pixel circuit shown in FIG. 5 according to at least one embodiment of the present disclosure.

As shown in FIG. 6, when at least one embodiment of the pixel circuit shown in FIG. 5 of the present disclosure is in operation, the display period may include a first phase t1, a second phase t2, and a third phase t3 that are set successively;

In the first phase t1, S1 provides a high voltage signal, S2 provides a high voltage signal, E1 provides a high voltage signal, T4 is turned on to write the first low voltage Vss into the gate electrode of T01; T3 is turned on, and D1 provides the control data voltage Vdata1, to write Vdata1 into the first node m;

In the first phase t1, when Vdata1 is a high voltage signal, T1 is turned on, T2 is turned off, and the gate electrode of T01 is connected to the gate electrode of T02;

In the first phase t1, when Vdata1 is a low voltage signal, T1 is turned off, and T2 is turned on, so as to write a second low voltage into the gate electrode of T02;

In the second phase t2, S1 provides a low voltage signal, S2 provides a low voltage signal, E1 provides a high voltage signal, T6 is turned on, DO provides the data voltage Vdata0 to write the data voltage Vdata0 into the source electrode of T01, and T5 is turned on;

At the beginning of the second phase t2, T01 and T02 are turned on, Vdata0 charges C2 through T6, T01, T02 and T5, until T01 and T02 are turned off, at this time, the potential of the gate electrode of T01 becomes Vdata0+Vth;

In the third phase t3, S1 provides a low voltage signal, S2 provides a high voltage signal, E1 provides a low voltage signal, T5 and T8 are turned on;

When in the first phase t1, T1 is turned on, T2 is turned off, and the gate electrode of T01 is connected to T02, in the third phase t3, T01 and T02 jointly drive O1 to emit light;

When in the first phase t1, T1 is turned off and T2 is turned on to write the second low voltage into the gate electrode of T02, in the third phase t3, T02 is fully turned on, and T01 drives O1 to emit light.

In at least one embodiment of the pixel circuit shown in FIG. 5, the width of the channel of T01 and the width of the channel of T02 are both W, the length of the channel of T01 is L1, and the length of the channel of T02 is L2.

When at least one embodiment of the pixel circuit shown in FIG. 5 of the present disclosure is in operation, In the third phase t3, when displaying low grayscale, T01 and T02 jointly drive O1 to emit light, and the current I flowing through O1 is equal to 0.5 $(W/(L1+L2))\times Cox\times\mu\times(Vdata0-Vdd)^2$; wherein Cox is the capacitance of the gate oxide layer per unit area, μ is the mobility;

In the third phase, when performing high grayscale display, T02 is fully turned on, and T01 drives O1 to emit light. At this time, the current I flowing through O1 is equal to 0.5 $(W/L1)\times Cox\times\mu\times(Vdata0-Vdd)^2$.

Figure 7:
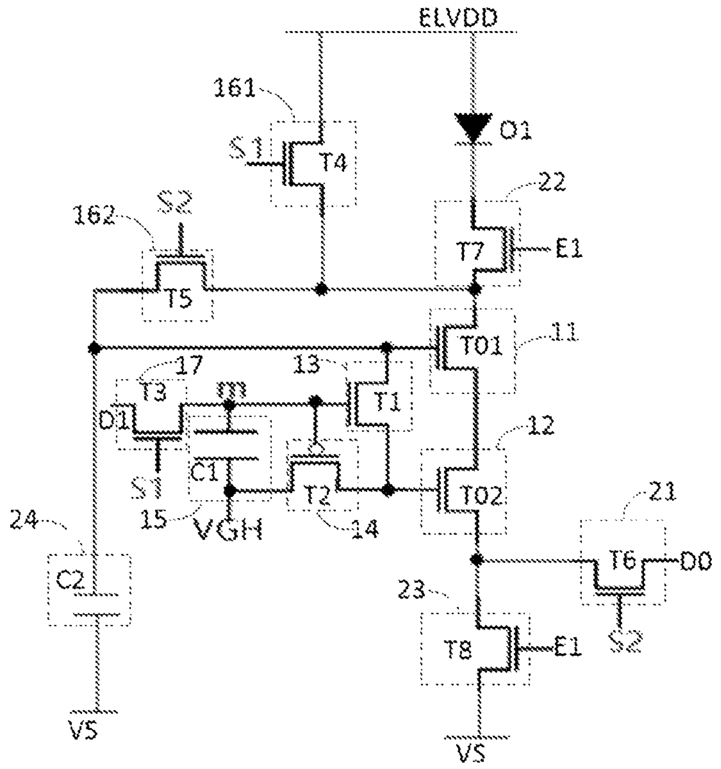
FIG. 7 is a circuit diagram of a pixel circuit according to at least one embodiment of the present disclosure.

As shown in FIG. 7, on the basis of the pixel circuit shown in FIG. 4, the first control circuit 13 includes a first transistor T1; the first driving circuit 11 includes a first driving transistor T01, the second driving circuit 12 includes a second driving transistor T02;

The gate electrode of the first transistor T1 is electrically connected to the first node m, the source electrode of the first transistor T1 is electrically connected to the gate electrode of the first driving transistor T01, and the drain electrode of the first transistor T1 is electrically connected to the gate electrode of the second driving transistor T02;

The setting circuit includes a second transistor T2;

The gate electrode of the second transistor T2 is electrically connected to the first node m, the source electrode of the second transistor T2 is electrically connected to the high voltage end VGH, and the drain electrode of the second transistor T2 is electrically connected to the gate electrode of the second driving transistor T02; the high voltage end VGH is used to provide a high voltage;

The control data voltage writing-in circuit 17 includes a third transistor T3;

The gate electrode of the third transistor T3 is electrically connected to the first control end S1, the source electrode of the third transistor T3 is electrically connected to the control data voltage writing-in end D1, and the drain electrode of the third transistor T3 is electrically connected to the first node m;

The first energy storage circuit 15 includes a first capacitor C1;

The first node m is electrically connected to the first end of the first capacitor C1, and the second end of the first capacitor C1 is electrically connected to the high voltage end VGH;

The first control sub-circuit 161 includes a fourth transistor T4, and the second control sub-circuit 162 includes a fifth transistor T5;

The gate electrode of the fourth transistor T4 is electrically connected to the first control end S1, the source electrode of the fourth transistor T4 is electrically connected to the power supply voltage end ELVDD, and the drain electrode of the fourth transistor T4 is electrically connected to the gate electrode of the first driving transistor T01; the power supply voltage end is used to provide a power supply voltage Vdd;

The gate electrode of the fifth transistor T5 is electrically connected to the second control end S2, the source electrode of the fifth transistor T5 is electrically connected to the gate electrode of the first driving transistor T01, and the drain electrode of the fifth transistor T5 is electrically connected to the source electrode of the first driving transistor T01;

The light emitting element is an organic light emitting diode O1, the data writing-in circuit 21 includes a sixth transistor T6, the first light emitting control circuit 22 includes a seventh transistor T7, and the second light emitting control circuit 23 includes an eighth transistor T8, the second energy storage circuit 24 includes a second capacitor C2; the anode of the organic light emitting diode O1 is electrically connected to the power supply voltage end ELVDD; the power supply voltage end is used to provide a power supply voltage Vdd;

The gate electrode of the sixth transistor T6 is electrically connected to the second control end S2, the source electrode of the sixth transistor T6 is electrically connected to the data line D0, and the drain electrode of the sixth transistor T6 is electrically connected to the drain electrode of the second driving transistor T02;

The gate electrode of the seventh transistor T7 is electrically connected to the light emitting control end E1, the source electrode of the seventh transistor T7 is electrically connected to the cathode of the organic light emitting diode O1, and the drain electrode of the seventh transistor T7 is electrically connected to the source electrode of the first driving transistor T01;

The gate electrode of the eighth transistor T8 is electrically connected to the light emitting control end E1, the source electrode of the eighth transistor T8 is electrically connected to the drain electrode of the second driving transistor T02, and the drain electrode of the eighth transistor T8 The electrode is electrically connected to the first low voltage end VS; the first low voltage end VS is used to provide the first low voltage Vss;

A first end of the second capacitor C2 is electrically connected to the gate electrode of the first driving transistor T01, and a second end of the second capacitor C2 is electrically connected to the first low voltage end VS.

In at least one embodiment of the pixel circuit shown in FIG. 7, the threshold voltage of T01 is equal to the threshold voltage of T02, and both the threshold voltage of T01 and the threshold voltage of T02 are Vth.

In at least one embodiment of the pixel circuit shown in FIG. 7, the first writing-in control end and the first control end are the same control end, and the second writing-in control end and the second control end are the same control end; the second setting voltage end may be a power supply voltage end ELVDD, and the first setting voltage end may be a high voltage end VGH, but not limited thereto.

In at least one embodiment of the pixel circuit shown in FIG. 7, T2 is a p-type transistor, and T1, T3, T4, T5, T6, T7, T8, T01 and T02 are all n-type transistors, but not limited thereto.

Figure 8:
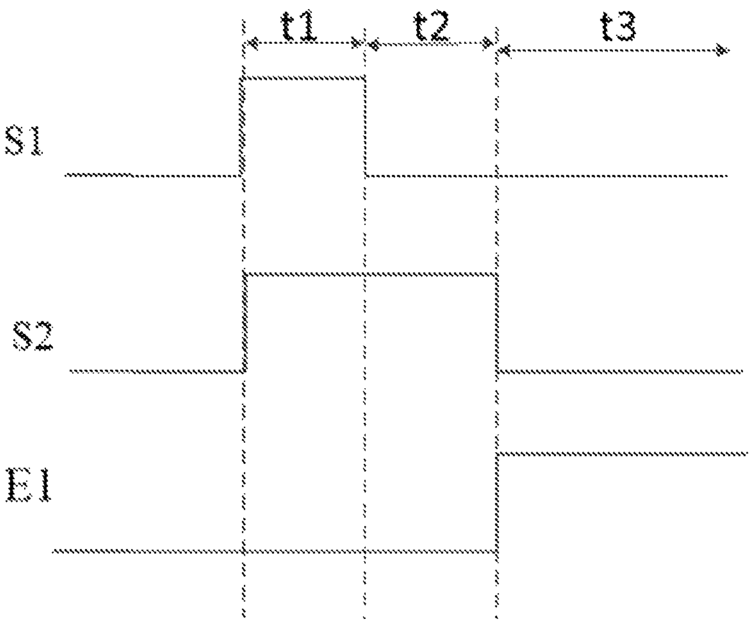
FIG. 8 is a working timing diagram of the pixel circuit shown in FIG. 7 according to at least one embodiment of the present disclosure.

As shown in FIG. 8, when at least one embodiment of the pixel circuit shown in FIG. 7 of the present disclosure is in operation, the display period includes a first phase t1, a second phase t2, and a third phase t3 that are set successively;

In the first phase t1, S1 provides a high voltage signal, S2 provides a high voltage signal, E1 provides a low voltage signal, T4 and T5 are turned on to write the power supply voltage Vdd into the gate electrode of T01; T3 is turned on, and D1 provides the control data voltage Vdata1 to the first node m;

In the first phase t1, when Vdata1 is a high voltage signal, T1 is turned on, and T2 is turned off, so that the gate electrode of T01 and the gate electrode of T02 are connected;

In the first phase t1, when Vdata1 is a low voltage signal, T1 is turned off, and T2 is turned on, so as to write the high voltage provided by the high voltage end VGH into the gate electrode of T02;

In the second phase t2, S1 provides a low voltage signal, S2 provides a high voltage signal, E1 provides a low voltage signal, DO provides a data voltage Vdata0, and T6 is turned on to write the data voltage Vdata0 into the drain electrode of T02;

At the beginning of the second phase t2, T01 and T02 are turned on, and Vdata0 charges C2 through T6, T01, T02 and T5 to increase the potential of the gate electrode of T01 until T01 is turned off; at this time, the potential of the gate electrode of T01 becomes Vdata0+Vth;

In the third phase t3, S1 provides a low voltage signal, S2 provides a low voltage signal, E1 provides a high voltage signal, T7 and T8 are both turned on; the potential of the source electrode of T1 is Vdd−Voled, and Voled is the threshold turn-on voltage of O1;

When the gate electrode of T01 is connected to the gate electrode of T02 in the first phase t1, in the third phase t3, T01 and T02 jointly drive O1 to emit light;

When in the first phase t1, T1 is turned off and T2 is turned on to write the high voltage provided by the high voltage end VGH into the gate electrode of T02, in the third phase t3, T01 drives O1 to emit light, and T02 is fully turned on.

In at least one embodiment of the pixel circuit shown in FIG. 7, the width of the channel of T01 and the width of the channel of T02 are both W, the length of the channel of T01 is L1, and the length of the channel of T02 is L2.

When at least one embodiment of the pixel circuit shown in FIG. 7 of the present disclosure is in operation, In the third phase t3, when displaying low grayscale, T01 and T02 jointly drive O1 to emit light, and the current I flowing through O1 is equal to $0.5\ (W/(L1+L2))\times Cox\times \mu\times (Vdata0-Vdd+Voled)^2$; wherein Cox is the capacitance of the gate oxide layer per unit area, u is the mobility;

In the third phase, when performing high grayscale display, T02 is fully turned on, and T01 drives O1 to emit light. At this time, the current I flowing through O1 is equal to $0.5\ (W/L1)\times Cox\times \mu\times (Vdata0-Vdd+Voled)^2$.

The driving method described in the embodiment of the present disclosure is applied to the above-mentioned pixel circuit, and the driving method includes:

Controlling, by the first control circuit, to connect or disconnect the control end of the first driving circuit and the control end of the second driving circuit under the control of the potential of the first node;

Writing, by the setting circuit, the first setting voltage provided by the first setting voltage end into the control end of the second driving circuit under the control of the potential of the first node;

The second control circuit is used to provide the second setting voltage to the control end of the first driving circuit under the control of the control signal provided by the charging control end, and control to connect or disconnect the control end of the first driving circuit and the connection node;

The control data voltage writing-in circuit writes the control data voltage provided by the control data voltage writing-in end into the first node under the control of the first writing-in control signal;

The first driving circuit generates a driving current flowing from the first end of the first driving circuit to the second end of the first driving circuit under the control of the potential of the control end of the first driving circuit;

The second driving circuit drives the light emitting element under the control of the potential of the control end of the second driving circuit, or, the second driving circuit controls to connect or disconnect the first end of the second driving circuit and the second end of the second driving circuit under the control of the potential of the control end of the second driving circuit.

In at least one embodiment of the present disclosure, the second control circuit includes a first control sub-circuit and a second control sub-circuit; the connection node is electrically connected to the second end of the second driving circuit; the pixel circuit further includes a light emitting element, a data writing-in circuit, a first light emitting control circuit, a second light emitting control circuit, and a second energy storage circuit; the display period includes a first phase, a second phase, and a third phase set successively; the driving method includes:

In the first phase, the first control sub-circuit writing the second setting voltage provided by the second setting voltage end into the control end of the first driving circuit under the control of the first control signal; the control data voltage writing-in circuit writing the control data voltage provided by the control data voltage writing-in end into the first node under the control of the first writing-in control signal provided by the first writing-in control end;

In the first phase, when the control data voltage is the second voltage signal, the first control circuit controls to connect the control end of the first driving circuit and the control end of the second driving circuit under the control of the potential of the first node; when the control data voltage is a third voltage signal, the setting circuit writing the first setting voltage provided by the first setting voltage end to the control end of the second driving circuit under the control of the potential of the first node;

In the second phase, the data writing-in circuit writing the data voltage provided by the data line into the first end of the first driving circuit under the control of the second writing-in control signal; the second control sub-circuit controlling to connect the control end of the first driving circuit and the second end of the second driving circuit under the control of the second control signal;

In the third phase, the first light emitting control circuit controlling to connect the power supply voltage end and the first end of the first driving circuit under the control of the light emitting control signal; controlling to connect the second end of the second driving circuit and the first electrode of the light emitting element under the control of the light emitting control signal;

When in the first phase, the first control circuit controlling to connect the control end of the first driving circuit and the control end of the second driving circuit under the control of the potential of the first node, and in the third phase, the first driving circuit and the second driving circuit driving the light emitting element to emit light;

When in the first phase, the setting circuit writing the first setting voltage provided by the first setting voltage end into the control end of the second driving circuit under the control of the potential of the first node, in the third phase, the first driving circuit driving the light emitting element to emit light, and the second driving circuit controlling to connect the first end of the second driving circuit and the second end of the second driving circuit.

In at least one embodiment of the present disclosure, the second control circuit includes a first control sub-circuit and a second control sub-circuit; the connection node is electrically connected to the first end of the first driving circuit; the pixel circuit also includes a light emitting element, a data writing-in circuit, a first light emitting control circuit, a second light emitting control circuit, and a second energy storage circuit; the display period includes a first phase, a second phase, and a third phase set successively; the driving method include:

In the first phase, the first control sub-circuit writing the second setting voltage provided by the second setting voltage end into the first end of the first driving circuit under the control of the first control signal; the second control sub-circuit controlling to connect the control end of the first driving circuit and the first end of the first driving circuit under the control of the second control signal; the control data voltage writing-in circuit writing the control data voltage provided by the control data voltage writing-in end into the first node under the control of the first writing-in control signal provided by the first writing-in control end;

In the first phase, when the control data voltage is the fourth voltage signal, the first control circuit controlling to connect the control end of the first driving circuit and the control end of the second driving circuit under the control of the potential of the first node; when the control data voltage is the fifth voltage signal, the setting circuit writing the first setting voltage provided by the first setting voltage end into the control end of the second driving circuit under the control of the potential of the first node;

In the second light emitting phase, the data writing-in circuit writing the data voltage provided by the data line into the second end of the second driving circuit under the control of the second writing-in control signal; the second control sub-circuit controlling to connect the control end of the first driving circuit and the first end of the first driving circuit under the control of the second control signal;

In the third phase, the first light emitting control circuit controlling to connect the second electrode of the light emitting element and the first end of the first driving circuit under the control of the light emitting control signal; the second light emitting control circuit controlling to connect the second end of the second driving circuit and the first voltage end under the control of the light emitting control signal;

When in the first phase, the first control circuit controlling to connect the control end of the first driving circuit and the control end of the second driving circuit under the control of the potential of the first node, in the third phase, the first driving circuit and the second driving circuit driving the light emitting element to emit light;

When in the first phase, the setting circuit writing the first setting voltage provided by the first setting voltage end into the control end of the second driving circuit under the control of the potential of the first node, in the third phase, the first driving circuit driving the light emitting element to emit light, and the second driving circuit controlling to connect the first end of the second driving circuit and the second end of the second driving circuit.

The display device described in the embodiment of the present disclosure includes the above-mentioned pixel circuit.

The display device provided by the embodiments of the present disclosure may be any product or component with a display function, such as a mobile phone, a tablet computer, a television, a monitor, a notebook computer, a digital photo frame, a navigator, and the like.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pixel circuit, comprising a light emitting element, a first driving circuit, a second driving circuit, a first control circuit, a setting circuit, a first energy storage circuit, a second control circuit and a control data voltage writing-in circuit; wherein the first driving circuit is configured to generate a driving current flowing from a first end of the first driving circuit to a second end of the first driving circuit under the control of a potential of a control end of the first driving circuit;

the second end of the first driving circuit is electrically connected to a first end of the second driving circuit;

the first control circuit is electrically connected to a first node, the control end of the first driving circuit, and a control end of the second driving circuit respectively, and is configured to control to connect or disconnect the control end of the first driving circuit and the control end of the second driving circuit under the control of a potential of the first node;

the setting circuit is electrically connected to the first node, a first setting voltage end and the control end of the second driving circuit, and is configured to write a first setting voltage provided by the first setting voltage end into the control end of the second driving circuit under the control of the potential of the first node; the first node is electrically connected to a first end of the first energy storage circuit, and a second end of the first energy storage circuit is electrically connected to the first setting voltage end; the first energy storage circuit is used for storing electric energy;

the second control circuit is configured to provide a second setting voltage to the control end of the first driving circuit and control to connect or disconnect the control end of the first driving circuit and a connection node under the control of a control signal provided by a charging control end; the connection node is electrically connected to the second end of the second driving circuit or the first end of the first driving circuit;

the control data voltage writing-in circuit is electrically connected to a first writing-in control end, a control data voltage writing-in end and the first node respectively, and is configured to write a control data voltage provided by the control data voltage writing-in end into the first node under the control of a first writing-in control signal provided by the first writing-in control end;

the second driving circuit is configured to drive the light emitting element under the control of a potential of the control end of the second driving circuit, or to control to connect or disconnect the first end of the second driving circuit and the second end of the second driving circuit.

2. The pixel circuit according to claim 1, wherein the second control circuit includes a first control sub-circuit and a second control sub-circuit; the charging control end includes a first control end and a second control end; the connection node is electrically connected to the second end of the second driving circuit;

the first control sub-circuit is electrically connected to a first control end, a second setting voltage end and the control end of the first driving circuit respectively, and is configured to write a second setting voltage provided by the second setting voltage end into the control end of the first driving circuit under the control of a first control signal provided by the first control end;

the second control sub-circuit is electrically connected to a second control end, the control end of the first driving circuit and the second end of the second driving circuit respectively, is configured to control to connect the control end of the first driving circuit and the second end of the second driving circuit under the control of a second control signal provided by the second control end.

3. The pixel circuit according to claim 1, wherein the second control circuit includes a first control sub-circuit and a second control sub-circuit; the charging control end includes a first control end and a second control end; the connection node is connected to the first end of the first driving circuit;

the first control sub-circuit is electrically connected to a first control end, a second setting voltage end and the first end of the first driving circuit respectively, and is configured to write a second setting voltage provided by the second setting voltage end into the first end of the first driving circuit under the control of a first control signal provided by the first control end;

the second control sub-circuit is electrically connected to a second control end, the control end of the first driving circuit and the first end of the first driving circuit, is configured to control to connect the control end of the first driving circuit and the first end of the first driving circuit under the control of a second control signal provided by the second control end.

4. The pixel circuit according to claim 2, further comprising a data writing-in circuit, a first light emitting control circuit, a second light emitting control circuit and a second energy storage circuit; wherein the data writing-in circuit is electrically connected to a second writing-in control end, a data line, and the first end of the first driving circuit respectively, and is configured to write a data voltage provided by the data line into the first end of the first driving circuit under the control of a second writing-in control signal provided by the second writing-in control end;

the first light emitting control circuit is electrically connected to a light emitting control end, a power supply voltage end and the first end of the first driving circuit respectively, and is configured to control to connect or disconnect the power supply voltage end and the first end of the first driving circuit under the control of a light emitting control signal provided by the light emitting control end;

the second light emitting control circuit is electrically connected to the light emitting control end, the second end of the second driving circuit, and a first electrode of the light emitting element respectively, and is configured to control to connect the second end of the second driving circuit and the first electrode of the light emitting element under the control of the light emitting control signal;

a first end of the second energy storage circuit is electrically connected to the control end of the first driving circuit, and a second end of the second energy storage circuit is electrically connected to the power supply voltage end, the second energy storage circuit is used for storing electric energy, a second electrode of the light emitting element is electrically connected to the first voltage end.

5. The pixel circuit according to claim 3, further comprising a light emitting element, a data writing-in circuit, a first light emitting control circuit, a second light emitting control circuit and a second energy storage circuit; wherein a first electrode of the light emitting element is electrically connected to a power supply voltage end;

the data writing-in circuit is electrically connected to a second writing-in control end, a data line, and the second end of the second driving circuit respectively, and is configured to write a data voltage provided by the data line into the second end of the second driving circuit under the control of a second writing-in control signal provided by the second writing-in control end;

the first light emitting control circuit is electrically connected to a light emitting control end, a second electrode of the light emitting element and the first end of the first driving circuit respectively, and is configured to control to connect the second electrode of the light emitting element and the first end of the first driving circuit under the control of a light emitting control signal provided by the light emitting control end;

the second light emitting control circuit is electrically connected to the light emitting control end, the second end of the second driving circuit, and a first voltage end respectively, and is configured to control to connect the second end of the second driving circuit and the first voltage end under the control of a light emitting control signal;

a first end of the second energy storage circuit is electrically connected to the control end of the first driving circuit, and a second end of the second energy storage circuit is electrically connected to the first voltage end, the second energy storage circuit is used for storing electric energy.

6. The pixel circuit according to claim 1, wherein the first control circuit comprises a first transistor;

a control electrode of the first transistor is electrically connected to the first node, a first electrode of the first transistor is electrically connected to the control end of the first driving circuit, and a second electrode of the first transistor is electrically connected to the control end of the second driving circuit;

the setting circuit includes a second transistor;

a control electrode of the second transistor is electrically connected to the first node, a first electrode of the second transistor is electrically connected to the first setting voltage end, and a second electrode of the second transistor is electrically connected to the control end of the second driving circuit;

the control data voltage writing-in circuit includes a third transistor;

a control electrode of the third transistor is electrically connected to the first writing-in control end, a first electrode of the third transistor is electrically connected to the control data voltage writing-in end, and a second electrode of the third transistor is electrically connected to the first node;

the first energy storage circuit includes a first capacitor;

the first node is electrically connected to a first end of the first capacitor, and a second end of the first capacitor is electrically connected to the first setting voltage end.

7. The pixel circuit according to claim 2, wherein the first control sub-circuit comprises a fourth transistor, and the second control sub-circuit comprises a fifth transistor;

a control electrode of the fourth transistor is electrically connected to the first control end, a first electrode of the fourth transistor is electrically connected to the second setting voltage end, and a second electrode of the fourth transistor is electrically connected to the control end of the first driving circuit;

a control electrode of the fifth transistor is electrically connected to the second control end, a first electrode of the fifth transistor is electrically connected to the control end of the first driving circuit, and a second electrode of the fifth transistor is electrically connected to the second end of the second driving circuit.

8. The pixel circuit according to claim 3, wherein the first control sub-circuit includes a fourth transistor, and the second control sub-circuit includes a fifth transistor;

a control electrode of the fourth transistor is electrically connected to the first control end, a first electrode of the fourth transistor is electrically connected to the second setting voltage end, and a second electrode of the fourth transistor is electrically connected to the control end of the first driving circuit;

a control electrode of the fifth transistor is electrically connected to the second control end, a first electrode of the fifth transistor is electrically connected to the control end of the first driving circuit, and a second electrode of the fifth transistor is electrically connected to the first end of the first driving circuit.

9. The pixel circuit according to claim 4, wherein the light emitting element is an organic light emitting diode, the data writing-in circuit includes a sixth transistor, the first light emitting control circuit includes a seventh transistor, the second light emitting control circuit includes an eighth transistor, and the second energy storage circuit includes a second capacitor;

a control electrode of the sixth transistor is electrically connected to the second writing-in control end, a first electrode of the sixth transistor is electrically connected to the data line, and a second electrode of the sixth transistor is electrically connected to the first end of the first driving circuit;

a control electrode of the seventh transistor is electrically connected to the light emitting control end, a first electrode of the seventh transistor is electrically connected to the power supply voltage end, and a second electrode of the seventh transistor is electrically connected to the first end of the first driving circuit;

a control electrode of the eighth transistor is electrically connected to the light emitting control end, a first electrode of the eighth transistor is electrically connected to the second end of the second driving circuit, and a second electrode of the eighth transistor is electrically connected to an anode of the organic light emitting diode;

a first end of the second capacitor is electrically connected to the control end of the first driving circuit, a second end of the second capacitor is electrically connected to the power supply voltage end, and a cathode of the organic light emitting diode is electrically connected to the first voltage end.

10. The pixel circuit according to claim 5, wherein the light emitting element is an organic light emitting diode, the data writing-in circuit includes a sixth transistor, the first light emitting control circuit includes a seventh transistor, the second light emitting control circuit includes an eighth transistor, and the second energy storage circuit includes a second capacitor; an anode of the organic light emitting diode is electrically connected to the power supply voltage end;

a control electrode of the sixth transistor is electrically connected to the second writing-in control end, a first electrode of the sixth transistor is electrically connected to the data line, and a second electrode of the sixth transistor is electrically connected to the second end of the second driving circuit;

a control electrode of the seventh transistor is electrically connected to the light emitting control end, a first electrode of the seventh transistor is electrically connected to a cathode of the organic light emitting diode, and a second electrode of the seventh transistor is electrically connected to the first end of the first driving circuit;

a control electrode of the eighth transistor is electrically connected to the light emitting control end, a first electrode of the eighth transistor is electrically connected to the second end of the second driving circuit, and a second electrode of the eighth transistor is electrically connected to the first voltage end;

a first end of the second capacitor is electrically connected to the control end of the first driving circuit, and a second end of the second capacitor is electrically connected to the first voltage end.

11. The pixel circuit according to claim 1, wherein the first driving circuit includes a first driving transistor, and the second driving circuit includes a second driving transistor;

a control electrode of the first driving transistor is electrically connected to the control end of the first driving circuit, a first electrode of the first driving transistor is electrically connected to the first end of the first driving circuit, and a second electrode of the first driving transistor is electrically connected to the second end of the first driving circuit;

a control electrode of the second driving transistor is electrically connected to the control end of the second driving circuit, a first electrode of the second driving transistor is electrically connected to the first end of the second driving circuit, and a second electrode of the second driving transistor is electrically connected to the second end of the second driving circuit.

12. A driving method applied to the pixel circuit according to claim 1, the driving method comprises:

controlling, by the first control circuit, to connect or disconnect the control end of the first driving circuit and the control end of the second driving circuit under the control of the potential of the first node;

writing, by the setting circuit, the first setting voltage provided by the first setting voltage end into the control end of the second driving circuit under the control of the potential of the first node;

providing, by the second control circuit, the second setting voltage to the control end of the first driving circuit under the control of the control signal provided by the charging control end, and controlling to connect or disconnect the control end of the first driving circuit and the connection node;

writing, by the control data voltage writing-in circuit, the control data voltage provided by the control data voltage writing-in end into the first node under the control of the first writing-in control signal;

generating, by the first driving circuit, a driving current flowing from the first end of the first driving circuit to the second end of the first driving circuit under the control of the potential of the control end of the first driving circuit;

driving, by the second driving circuit, the light emitting element under the control of the potential of the control end of the second driving circuit, or, controlling to connect or disconnect the first end of the second driving circuit and the second end of the second driving circuit under the control of the potential of the control end of the second driving circuit.

13. The driving method according to claim 12, wherein the second control circuit includes a first control sub-circuit and a second control sub-circuit; the connection node is electrically connected to the second end of the second driving circuit; the pixel circuit further includes a light emitting element, a data writing-in circuit, a first light emitting control circuit, a second light emitting control circuit, and a second energy storage circuit; a display period includes a first phase, a second phase, and a third phase set successively; the driving method includes:

in the first phase, the first control sub-circuit writing the second setting voltage provided by the second setting voltage end into the control end of the first driving circuit under the control of the first control signal; the control data voltage writing-in circuit writing the control data voltage provided by the control data voltage writing-in end into the first node under the control of the first writing-in control signal provided by the first writing-in control end;

in the first phase, when the control data voltage is the second voltage signal, the first control circuit controlling to connect the control end of the first driving circuit and the control end of the second driving circuit under the control of the potential of the first node; when the control data voltage is a third voltage signal, the setting circuit writing the first setting voltage provided by the first setting voltage end to the control end of the second driving circuit under the control of the potential of the first node;

in the second phase, the data writing-in circuit writing the data voltage provided by the data line into the first end of the first driving circuit under the control of the second writing-in control signal; the second control sub-circuit controlling to connect the control end of the first driving circuit and the second end of the second driving circuit under the control of the second control signal;

in the third phase, the first light emitting control circuit controlling to connect the power supply voltage end and the first end of the first driving circuit under the control of the light emitting control signal; the second light emitting control circuit controlling to connect the second end of the second driving circuit and the first electrode of the light emitting element under the control of the light emitting control signal;

in the first phase, when the first control circuit controls to connect the control end of the first driving circuit and the control end of the second driving circuit under the control of the potential of the first node, and in the third phase, the first driving circuit and the second driving circuit driving the light emitting element to emit light;

in the first phase, when the setting circuit writes the first setting voltage provided by the first setting voltage end into the control end of the second driving circuit under the control of the potential of the first node, in the third phase, the first driving circuit driving the light emitting element to emit light, and the second driving circuit controlling to connect the first end of the second driving circuit and the second end of the second driving circuit.

14. The driving method according to claim 12, wherein the second control circuit includes a first control sub-circuit and a second control sub-circuit; the connection node is electrically connected to the first end of the first driving circuit; the pixel circuit further includes a light emitting element, a data writing-in circuit, a first light emitting control circuit, a second light emitting control circuit, and a second energy storage circuit; a display period includes a first phase, a second phase, and a third phase set successively; the driving method includes:

in the first phase, the first control sub-circuit writing the second setting voltage provided by the second setting voltage end into the first end of the first driving circuit under the control of the first control signal; the second control sub-circuit controlling to connect the control end of the first driving circuit and the first end of the first driving circuit under the control of the second control signal; the control data voltage writing-in circuit writing the control data voltage provided by the control data voltage writing-in end into the first node under the control of the first writing-in control signal provided by the first writing-in control end;

in the first phase, when the control data voltage is a fourth voltage signal, the first control circuit controlling to connect the control end of the first driving circuit and the control end of the second driving circuit under the control of the potential of the first node; when the control data voltage is a fifth voltage signal, the setting circuit writing the first setting voltage provided by the first setting voltage end into the control end of the second driving circuit under the control of the potential of the first node;

in the second light emitting phase, the data writing-in circuit writing the data voltage provided by the data line into the second end of the second driving circuit under the control of the second writing-in control signal; the second control sub-circuit controlling to connect the control end of the first driving circuit and the first end of the first driving circuit under the control of the second control signal;

in the third phase, the first light emitting control circuit controlling to connect the second electrode of the light emitting element and the first end of the first driving circuit under the control of the light emitting control signal; the second light emitting control circuit controlling to connect the second end of the second driving circuit and the first voltage end under the control of the light emitting control signal;

in the first phase, when the first control circuit controls to connect the control end of the first driving circuit and the control end of the second driving circuit under the control of the potential of the first node, in the third phase, the first driving circuit and the second driving circuit driving the light emitting element to emit light;

in the first phase, when the setting circuit writes the first setting voltage provided by the first setting voltage end into the control end of the second driving circuit under the control of the potential of the first node, in the third phase, the first driving circuit driving the light emitting element to emit light, and the second driving circuit controlling to connect the first end of the second driving circuit and the second end of the second driving circuit.

15. A display device comprising the pixel circuit according to claim 1.

16. The pixel circuit according to claim 2, wherein the first driving circuit includes a first driving transistor, and the second driving circuit includes a second driving transistor;

a control electrode of the first driving transistor is electrically connected to the control end of the first driving circuit, a first electrode of the first driving transistor is electrically connected to the first end of the first driving circuit, and a second electrode of the first driving transistor is electrically connected to the second end of the first driving circuit;

a control electrode of the second driving transistor is electrically connected to the control end of the second driving circuit, a first electrode of the second driving transistor is electrically connected to the first end of the second driving circuit, and a second electrode of the second driving transistor is electrically connected to the second end of the second driving circuit.

17. The pixel circuit according to claim 3, wherein the first driving circuit includes a first driving transistor, and the second driving circuit includes a second driving transistor;

a control electrode of the first driving transistor is electrically connected to the control end of the first driving circuit, a first electrode of the first driving transistor is electrically connected to the first end of the first driving circuit, and a second electrode of the first driving transistor is electrically connected to the second end of the first driving circuit;

a control electrode of the second driving transistor is electrically connected to the control end of the second driving circuit, a first electrode of the second driving transistor is electrically connected to the first end of the second driving circuit, and a second electrode of the second driving transistor is electrically connected to the second end of the second driving circuit.

18. The pixel circuit according to claim 4, wherein the first driving circuit includes a first driving transistor, and the second driving circuit includes a second driving transistor;

a control electrode of the first driving transistor is electrically connected to the control end of the first driving circuit, a first electrode of the first driving transistor is electrically connected to the first end of the first driving circuit, and a second electrode of the first driving transistor is electrically connected to the second end of the first driving circuit;

a control electrode of the second driving transistor is electrically connected to the control end of the second driving circuit, a first electrode of the second driving transistor is electrically connected to the first end of the second driving circuit, and a second electrode of the second driving transistor is electrically connected to the second end of the second driving circuit.

19. The pixel circuit according to claim 5, wherein the first driving circuit includes a first driving transistor, and the second driving circuit includes a second driving transistor;

a control electrode of the first driving transistor is electrically connected to the control end of the first driving circuit, a first electrode of the first driving transistor is electrically connected to the first end of the first driving circuit, and a second electrode of the first driving transistor is electrically connected to the second end of the first driving circuit;

a control electrode of the second driving transistor is electrically connected to the control end of the second driving circuit, a first electrode of the second driving transistor is electrically connected to the first end of the second driving circuit, and a second electrode of the second driving transistor is electrically connected to the second end of the second driving circuit.

20. The pixel circuit according to claim 6, wherein the first driving circuit includes a first driving transistor, and the second driving circuit includes a second driving transistor;

a control electrode of the first driving transistor is electrically connected to the control end of the first driving circuit, a first electrode of the first driving transistor is electrically connected to the first end of the first driving circuit, and a second electrode of the first driving transistor is electrically connected to the second end of the first driving circuit;

a control electrode of the second driving transistor is electrically connected to the control end of the second driving circuit, a first electrode of the second driving transistor is electrically connected to the first end of the second driving circuit, and a second electrode of the second driving transistor is electrically connected to the second end of the second driving circuit.

* * * * *